United States Patent

Searby et al.

[11] Patent Number: 5,077,610
[45] Date of Patent: Dec. 31, 1991

[54] PREVIEWING CUTS AND TRANSFORMATIONS IN AN ELECTRONIC IMAGE COMPOSITION SYSTEM

[75] Inventors: Anthony D. Searby; Colin J. Wrey, both of Newbury, England

[73] Assignee: Quantel Limited, Newbury, England

[21] Appl. No.: 534,713

[22] Filed: Jun. 7, 1990

[30] Foreign Application Priority Data

Jun. 14, 1989 [GB] United Kingdom ............... 8913638

[51] Int. Cl.$^5$ .......................................... H04N 5/262
[52] U.S. Cl. ................................... 358/183; 358/182; 358/93; 395/155
[58] Field of Search ............... 358/180, 181, 182, 183, 358/160, 20, 21 R, 21 V, 22, 25, 93; 340/728, 723, 724, 721, 734, 712; 382/44, 45, 47, 49; 364/522, 518

[56] References Cited

U.S. PATENT DOCUMENTS

| | | | |
|---|---|---|---|
| 4,539,585 | 9/1985 | Spackova | 358/93 |
| 4,641,255 | 3/1987 | Hohmann | 364/522 |
| 4,713,695 | 12/1987 | Macheboeuf | 358/183 |

FOREIGN PATENT DOCUMENTS

| | | |
|---|---|---|
| 0142994 | 5/1955 | European Pat. Off. . |
| 0256816 | 8/1987 | United Kingdom . |

Primary Examiner—Howard W. Britton
Assistant Examiner—Tuan V. Ho
Attorney, Agent, or Firm—Cooper & Dunham

[57] ABSTRACT

An electronic image composition system in which in a preview mode of operation an image or image portion is manipulated and displayed substantially in real-time. In a compositing mode the image is finally composed (or stuck) into a background image. During the previewing stage, only a selected number of pixels representing the image are transformed and the remainder are derived from said transformed pixels by filtering or, preferably, replication.

15 Claims, 2 Drawing Sheets

PREVIEWING CUTS AND TRANSFORMATIONS IN AN ELECTRONIC IMAGE COMPOSITION SYSTEM

FIELD OF THE INVENTION

The invention relates to electronic image composition systems.

BACKGROUND OF THE INVENTION

Electronic image composition systems are known, having storage means for storing video signals representing at least two pictures, preview means for displaying a series of artist-selected transformations of a first of said pictures, or a part thereof, until a desired transformation is perceived, and compositing means for thereafter producing composite pictures by combining transformed video signals, or a part thereof, with video signals of a second of said pictures.

An example of such a system is that included in the video graphic equipment manufactured by the present Assignee/Applicant and sold under the trade mark "PAINTBOX". In addition to the composition system, this equipment also includes an electronic painting system which allows an artist to "paint" either or both of said pictures into the storage means, in response to (among other things) movement of a stylus over a touch tablet, which simulates a painting or drawing implement. The image composition system referred to above is described in U.S. Pat. No. 4,602,286 and equivalent British Patent No. 2113950 and the associated painting system is described in greater detail in U.S.. Pat. No. 4,514,818 and equivalent British Patent No. 2089625 both assigned to the present Assignee and included herein as part of the present disclosure.

In the equipment manufactured by the present Assignee and sold under the trade mark "PAINTBOX", additional storage means are provided which allow the painting system to create a control image which may be used to simulate a stencil, whereby part of the image being composed may be masked while the remainder remains exposed for further modification. This stencil signal is also used during operation of the compositing means to control the combining of video signals so as to simulate the "pasting" of the (transformed) chosen part of the first picture into the second picture. The preview means allows an artist to effect a series of transformations to the first picture (which may include changes in size, position, perspective orientation) until a desired transformation is perceived, whereupon (in response to a "stick" command) the compositing means combines the two images into a single store. The type of transformation required is defined by using predetermined movements of the stylus upon the touch tablet which is then implemented by reading video signals from the storage means in a different order from that in which they were written to said storage means.

To assist an artist in effecting the desired transformation, it is desirable for the transformed pictures to be displayed in real-time during preview that is to say, any operation effected by the artist should be displayed substantially instantaneously. However, the calculations involved in many of the transformations are not trivial and have to be repeated for each pixel in the transformed output. Thus, in practice, a portion of an image (often referred to as a "cut-out") can only be transformed in real-time if restrictions are placed on the number of pixels making up the cut-out or, alternatively, if the cut-out is shown as a surrounding margin which is manipulated in real-time, whereafter the full image is processed once the desired position has been identified by manipulation of the margin.

SUMMARY OF THE INVENTION

It is an object of the present invention to provide an improved system for transforming images.

According to one aspect of the present invention there is provided an electronic image composition system having means for storing video signals representing a first picture and a second picture, preview means for interactively displaying a series of artist-selected transformations of said first picture, or a part thereof, until a desired transformation is perceived, and compositing means for thereafter producing a composite picture by combining transformed video signals to said first picture, or part thereof, with said second picture; characterised by transforming means which, during operation of said preview means, provides transformed video signals for only selected pixels in the transformed picture and provides replications of, or derivatives from, said transformed video signals for other pixels, whereby the time required to produce transformations for preview is reduced, while during operation of said compositing means, said transformed means provides transform video signals for all the pixels of said transformed picture or said part thereof.

The provision of transformed video signals for only selective pixels in the transformed picture reduces the number of times a transform equation has to be solved to produce a particular transformation of the first picture, or a cut-out taken therefrom. However, the size of the transformed picture is not affected (compared to what it would have been had all the pixels been transformed) because replications, or derivatives, of the transformed video signals are produced for pixels which would otherwise not receive video signals. The generation of replications, or derivatives, can be effected rapidly and therefore there is a substantial saving in the amount of time required to produce a transformation for preview. The relationship between the number of pixels actually transformed and the number of pixels making up the transformed image, is referred to as the transform reduction factor, which may vary from one transformation to another. Thus, for example, a different transform reduction factor may be used when transformations which reduce the size of the image are being employed.

According to another aspect of the invention there is provided an electronic image manipulation system for use in manipulating an image defined as a plurality of picture elements in accordance with a user selected manipulation, the system being operable in a first mode in which user defined transformations are applied to only some of the picture elements for substantially instantaneous display of reduced representations of the image derived from said same picture elements transformed in accordance with the user defined transformations, and the system being operable in a second mode in which a final transformation is applied to all of the picture elements thereby to define a transformed image.

In a further aspect the invention provides an electronic image manipulation system for use in manipulating an image defined as a plurality of picture elements in accordance with a user selected manipulation, the system comprising an image storing means for storing data representing at least one image, a displaying means for displaying said image, a transforming means for transforming the data in the storing means, and a user operable input means for inputting data defining transforms to be performed by the transforming means, the transforming means being operable in a first mode in which transformations are applied to only some of the data for substantially instantaneous display of a reduced representation of the image on the displaying means and in a second mode in which a final transformation is applied to all of the image data.

The invention also provides a method of manipulating an image defined as a plurality of picture elements, the method comprising a first step of applying user defined transformations to only some of the picture elements and substantially instantaneously displaying reduced representations of the image derived from said transformed some picture elements and a stored step of applying a final transformation to all of the picture elements to create a transformed image.

The above and further features of the invention are set forth with particularity in the appended claims and together with advantages thereof will become clearer from consideration of the following detailed description of an exemplary embodiment of the invention given with reference to the accompanying drawings.

DESCRIPTION OF A PREFERRED EMBODIMENT OF THE INVENTION

Figure 1:
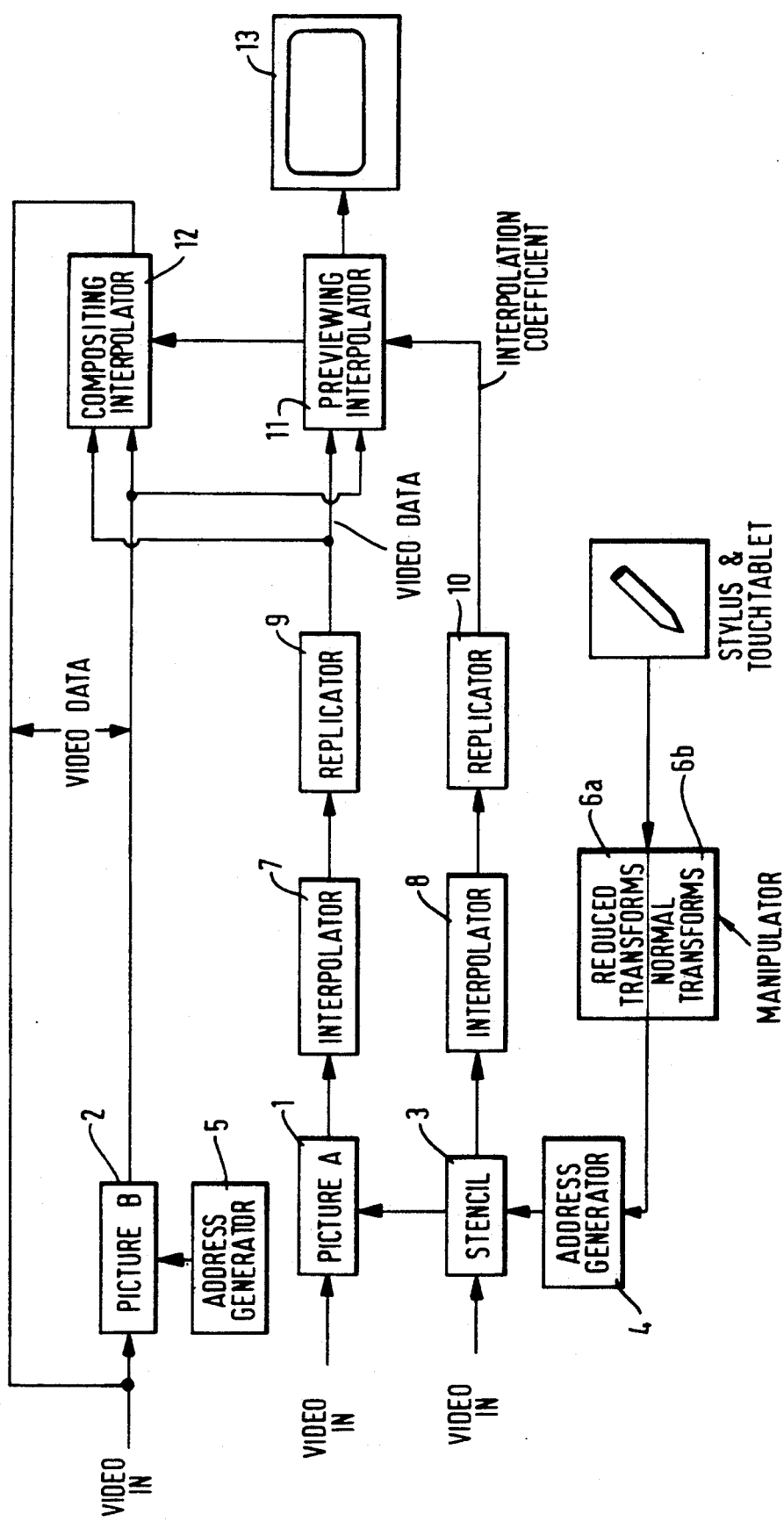
FIG. 1 is a block diagram of an image composition system.

Referring now to FIG. 1 of the accompanying drawings, an image composition system is shown. The image composition system of FIG. 1 is similar to that described in the aforesaid British Patent No. 2113950. The system comprises three framestores 1, 2 and 3, which are used for storing digital video signals representing three pictures, referred to herein as picture A, picture B and stencil. The first and second stores 1 and 2 have separate planes for storing different colour components of the picture, say red, green and blue (RGB) or luminance and colour difference, YUV. The stencil store 3, on the other hand, is only required to store a monochrome picture, of say eight bits per pixel and so a single plane is sufficient. As explained in British Patent No. 2113950, pictures can be painted into the stores 1, 2 and 3, or derived from other sources, such as a television camera. The signals in the stencil store 3 represent a stencil, which can be created for example to expose a selected part of picture A while masking the remainder thereof. The stencil signals defining the exposed area having a maximum value, those defining the masked area have a zero, or relatively low, value and those at the interface of the two areas vary gradually from the one value to the other.

The first store 1 and stencil store 3 have a common address generator 4 which provides write addresses when signals are written to the stores and provides read addresses when signals are read out from the stores. Normally, the first store 1 and the stencil store 3 are read in parallel, so that a selected positional relationship between the picture A and the stencil is maintained. The second store 2 has a separate read address generator 5 to control independently the writing and reading of video data therefrom.

The system also includes a manipulator 6 adapted to produce spatial transformations of the picture A and the stencil read from the first store 1 and the stencil store 3. The manipulator 6 is shown as two separate elements, a reduced transforms manipulator 6a and a normal transforms manipulator 6b, but can be implemented as a single arithmetic circuit. The manipulator 6 can be controlled to perform either reduced transformations, required when the system is configured in a preview mode, or full transformations, required during the final sticking process when the system is configured in a compositing mode, with switching between these two modes of operations being perfected by predetermined user instructions. The manipulator 6 employs sets of parameters defining difference transformations and the user, who it is envisaged will be an artist with little or no experience in the use of computers as such, can select a transformation (for example a rotation) and cause the transformation to progress in steps by predetermined movements of a pressure sensitive stylus on a touch tablet, or by operation of another suitable input device (not shown). After selection of a particular transformation, the manipulator 6 determines the address in the first store 1 from which video signals are to be read at particular times to "fill" the pixels in the transformed picture, the position of these pixels being predetermined by their order in the output sequence. In general, the address derived at any particular time by the manipulator 6 will not coincide exactly with a location in the first store 1, but will consist of an integer part, defining the address of the nearest location in the first store 1, and a fractional part, defining a sub-pixel deviation therefrom. The address generated in this form is therefore used to read pixel values from four adjacent addresses in the first store 1, which addresses are closest to the calculated address. These four pixel values are applied to an interpolator 7 which interpolates them in proportions determined by the fractional address of the pixel to derive a transformed output pixel. Transformed pixels output from interpolator 7 are applied to a replicator 9, the operation of which will become clearer in the following description, which in turn passes pixel values to a linear interpolation circuit 11. The linear interpolation circuit 11 also receives second input picture signals from the second store 2 which, during operation of the system, is read in response to address generator 5, to produce an output synchronised, pixel by pixel, with the output of interpolator 7.

The stencil store 3 is also read in response to the address generator 4 under the control of the manipulator 6 and the output signals from the stencil store 3 are applied to an interpolator 8, similar to the interpolator 7, and to a replicator 10, similar to the replicator 9. The resulting video signals defining the transformed stencil are applied to the linear interpolation circuit 11, where they function as interpolating coefficients for successive pixels. The linear interpolation circuit 11 is used when the system is configured in the preview mode and its output is applied to a monitor 13.

The transformed output from the first store 1 and the untransformed output from the second store 2, are also applied to a second linear interpolator circuit 12, which is used when the system is configured in the compositing mode i.e. during the "stick" process. Like the linear interpolation circuit 11, associated with the first store 1, the interpolator circuit 12 also receives the transformed output from the stencil store 3, which again functions as an interpolating coefficient. During the compositing mode, the replicators 9 and 10 are not required and they are rendered inoperative or transparent. The output of the linear interpolator circuit 12 is fed back to the framestore 2, where it overwrites the original picture read therefrom. As previously stated, this process is identified as a "stick" wherein the cut-out becomes a permanent part of the background picture. During compositing, the output of the linear interpolation circuit 11 can also be displayed on the monitor 13.

Figure 2:
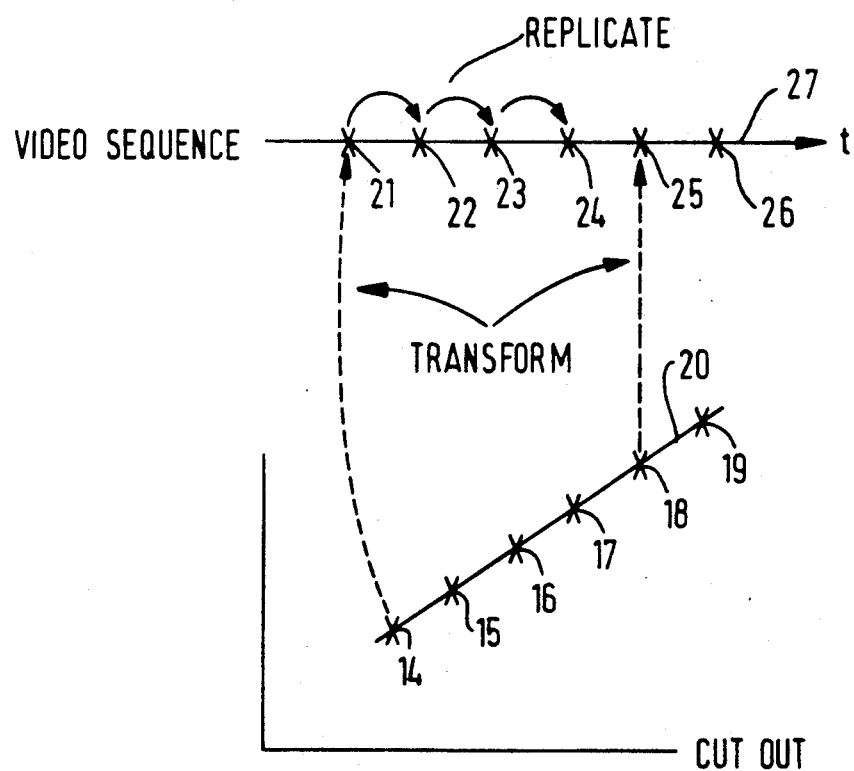
FIG. 2 is a diagram representing an operation performed by the system shown in FIG. 1.

The operation of the dual mode manipulator 6a/6b is illustrated in FIG. 2, in which a series of crosses 14 to 19 represent, say, storage locations in the first store 1, containing video signals defining a diagonal line 20 in a small part of picture A. For the purpose of explanation, it will now be assumed that a transformation has been selected which will rotate a cut-out taken from picture 1 so that the diagonal line becomes horizontal. Picture rotation transformations are per se known from for example our U.S. Pat. No, 4,611,232 and corresponding British Patent No. 2119197 the teachings of which re incorporated herein. Returning to FIG. 2, a series of crosses 21 to 26 represents successive pixels in the output picture defining a horizontal line 27 obtained by transforming respective pixels from the locations identified by the series of crosses 14 to 19. For the small part of the image shown, such a translation would previously have required five individual transform calculations to be made, one for each pixel 14 to 19 in the line 20. It will be appreciated that such an operation, when repeated for the whole cut-out, could preclude real-time processing in many cases, which is highly undesirable during preview. However, in the present embodiment, the manipulator 6 is conditioned, during preview, to perform transformations only on selected pixels in picture A as they are read in sequence from the first store 1. Thus, as represented in FIG. 2 of the accompanying drawings a transformation is performed for only every fourth pixel in the output sequence, e.g. pixels 21 and 25 and transforms are not carried out to define the intervening pixels i.e. pixels 22, 23, 24 etc. However, to avoid having gaps in the output sequence, a transformed pixel, e.g pixel 21, is replicated for the non-transformed pixels, e.g. pixels 22 to 24, and this procedure is followed over the whole cut-out. The same procedure is also applied to the stencil signal output from the stencil store 3. It will of course be appreciated that the selection of pixels to be transformed need not be limited to every fourth pixel and can instead be any number of selected pixels. The number may be predefined or may be selectable by use of the stylus from a menu of options displayed on the monitor 13.

As a result of this pixel replication, there is some degradation to the trial composition displayed on the monitor 13 during preview, but this is acceptable because the display at this point is only transient and is not representative of the quality of the image in the final picture. Also, the level of perceived degradation can be reduced by making the cut-out appear to be transparent so that the background image can be seen through the cut-out during preview. This can be done by limiting the stencil values to a predetermined maximum such that during preview the pixels representing the cut-out do not completely replace the pixels in the background i.e. picture B, but instead image position the display comprise a contribution from pixels in picture A, the cut-out, and picture B, the background.

Once a satisfactory result has been obtained, the manipulator 6a/6b is switched over to normal operation. During normal operation the manipulator 6a performs a transformation for every pixel of the cut-out including picture signals from the first picture store 1 and stencil signals from the stencil store 3. During the final sticking process, fast operation is not essential because real-time interaction is no longer required. The final sticking process as between pictures A and B is performed by the compositing interpolator 12 under the control of the stencil signals from the stencil store 3 at full resolution.

The degree of replication during the preview stage may be dependent, under the control of the operating software, on the nature of the transformation and the size of the cut-out. The replication may occur not only horizontally but also vertically, in which case pixels on some lines would not undergo transformation but would be filled by replications. Instead of using mere replications, pixels omitted during the transformation stage may be reconstructed by filtering or interpolating the transformed pixels. The only constraints placed on these more sophisticated techniques is that the filling process should be much quicker than the transformation process.

The invention is not of course confined in its application to systems such as those described in British Patents Nos. 2113950 and 2089625 and may be applied to any image composition system having a preview mode and a compositing mode. For example, the concept of making the cut-out transparent during preview can be applied to image manipulation systems such as the system sold by us under the trade mark "ENCORE" in which, among other things, one video sequence can be primed into another video sequence such as to create the effect of three dimensional movement of the one video sequence in the other sequence.

Furthermore, as described herein transformation is performed on the read side of the framestores but, if preferred, the transformation could equally be provided on the write side of the framestores.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

We claim:

1. An electronic image composition system comprising means for storing video signals representing a first picture and a second picture, preview means for interactively displaying a series of artist-selected transformations of said first picture, or a part thereof, until a desired transformation is perceived, and compositing means for thereafter producing a composite picture by combining transformed video signals of said first picture, or part thereof, with said second picture; characterised by transforming means which, during operation of said preview means, provides transformed video signals for only selective pixels in the transformed picture and provides replications of, or derivatives from, said transformed video signals for other pixels, whereby the time required to produce transformations for preview is reduced, while during operation of compositing means, said transforming means provides transformed video signals for all the pixel of said transformed picture or part thereof.

2. An electronic composition system according to claim 1 characterised by means for storing a stencil signal relating to the stored video signals of said first picture and transforming means which, during operation of said preview means, also provides transformed stencil signals.

3. An electronic composition system according to claim 1, characterised by means for adjusting a reduction factor relating to the number of transformed pixels to the number of replicated or derived pixels.

4. An electronic composition system according to claim 1, characterised by means for creating or modifying said stored video signals, including a pressure sensitive stylus and a touch tablet, wherein a parameter controlling the extent of modification receives a contribution determined by manual pressure applied to said stylus.

5. An electronic composition system according to claim 4, characterised in that said means for creating video signals is also arranged to create stencil signals.

6. An electronic image manipulation system for use in manipulating an image defined as a plurality of picture elements in accordance with a user selected manipulation, the system being operable in a first mode in which user defined transformations are applied to only some of the picture elements for substantially instantaneous display of reduced representations of the image derived from said some picture elements transformed in accordance with the user defined transformations, and the system being operable in a second mode in which a final transformation is applied to all of the picture elements thereby to define a transformed image.

7. An electronic image manipulation system as claimed in claim 6, wherein the transformed image is an image portion and is combined with another image to form a composite image.

8. An electronic image manipulation system as claimed in claim 7, wherein in said first mode other picture elements are derived as replications of said transformed some picture elements.

9. An electronic image manipulation system as claimed in claim 7, wherein the combining of the said two images is controlled by a stencil transformed in accordance with the transform applied to said image.

10. An electronic image manipulation system as claimed in claim 9, wherein in said first mode other picture elements are derived as replications of said transformed some picture elements.

11. An electronic image manipulation system as claimed in claim 6, wherein in said first mode other picture elements are derived as replications of said transformed some picture elements.

12. An electronic image manipulation system for use in manipulating an image defined as a plurality of picture elements in accordance with a user selected manipulation, the system comprising an image storing means for storing data representing at least one image, a displaying means for displaying an image, a transforming means for transforming the data in the storing means, and a user operable input means for inputting data defining transforms to be performed by the transforming means, the transforming means being operable in a first mode in which transformations are applied to only some of the data for substantially instantaneous display of a reduced representation of the image on the displaying means and in a second mode in which a final transformation is applied to all of the image data.

13. A method of manipulating an image defined as a plurality of picture elements, the method comprising a first step of applying user defined transformations to only some of the picture elements and substantially instantaneously displaying reduced representations of the image derived from said transformed some picture elements and a second step of applying a final transformation to all of the picture elements to create a transformed image.

14. A method as claimed in claim 13, wherein the transformed image is an image portion and further comprising the step of combining the image portion with another image to form a composite image in said first and second steps.

15. A method as claimed in claim 13, comprising in said first step deriving other picture elements as replications of said transformed some picture elements.

* * * * *